April 3, 1956 C. F. SCHNUCK 2,740,270
UNIVERSAL COUPLING
Filed April 17, 1953 2 Sheets-Sheet 1
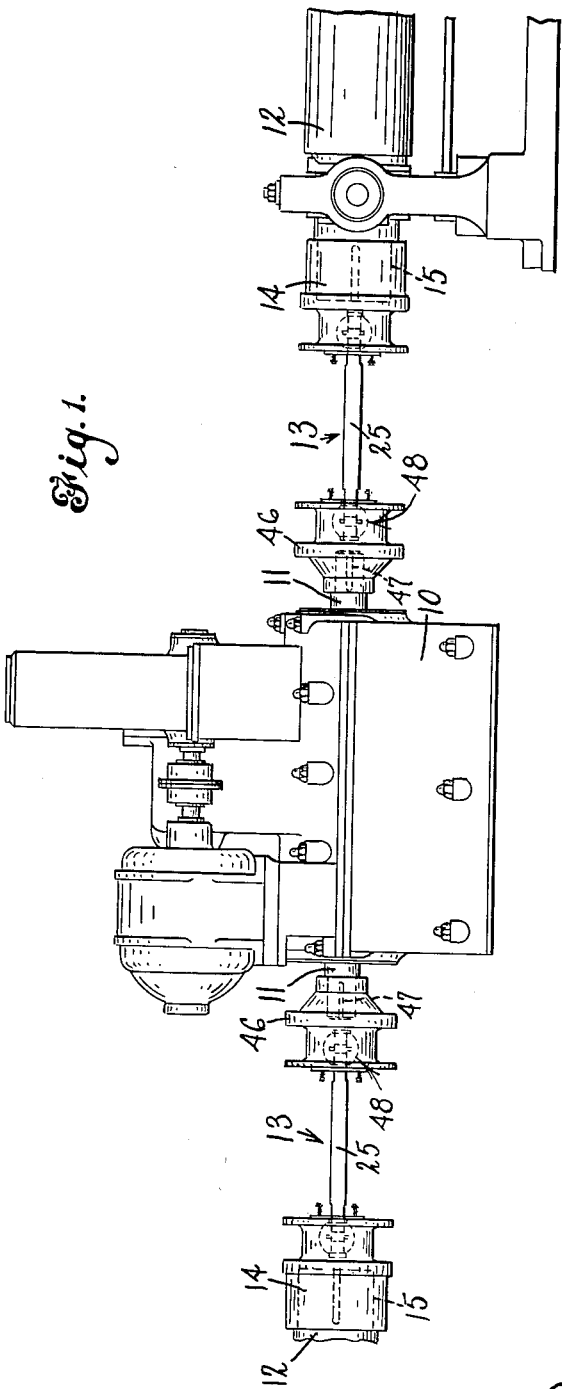
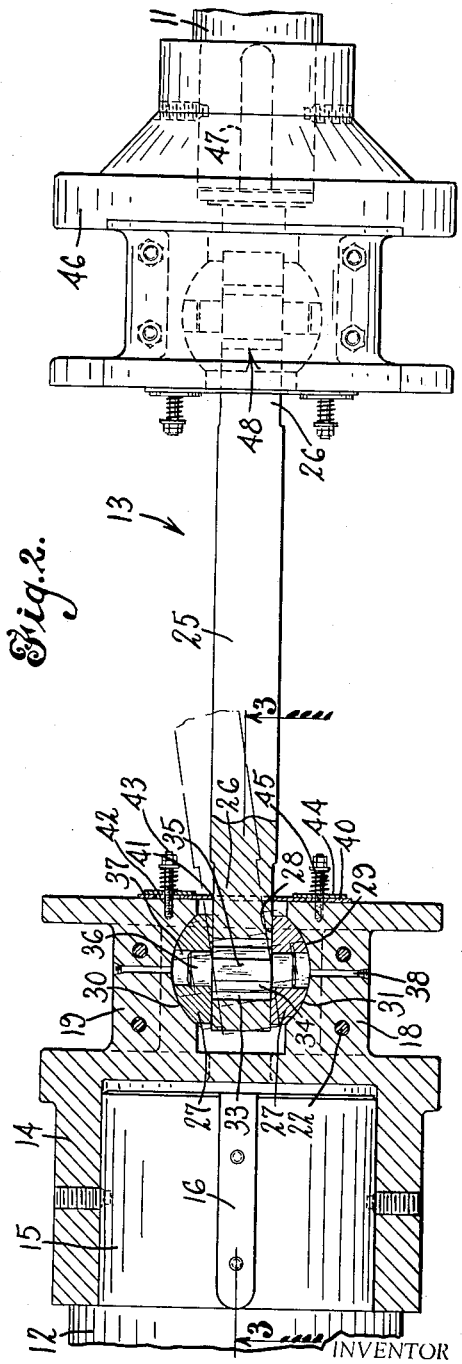
INVENTOR
Carl F. Schnuck
BY Rockwell & Bartholow
ATTORNEYS

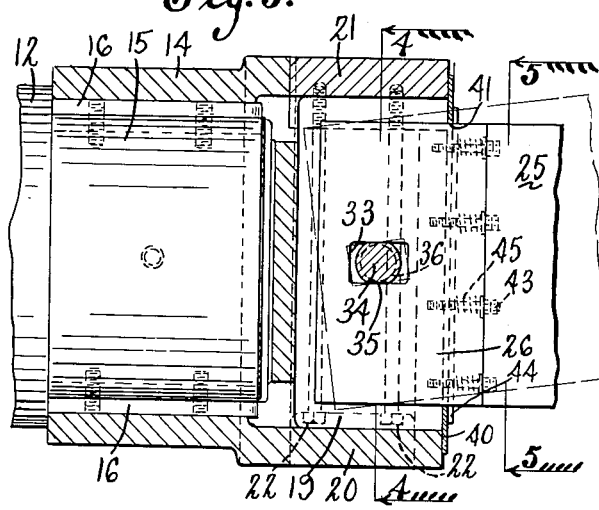
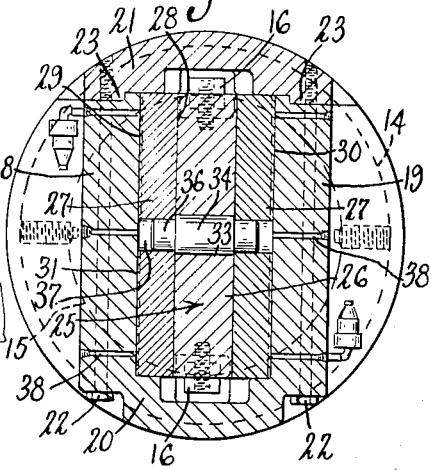
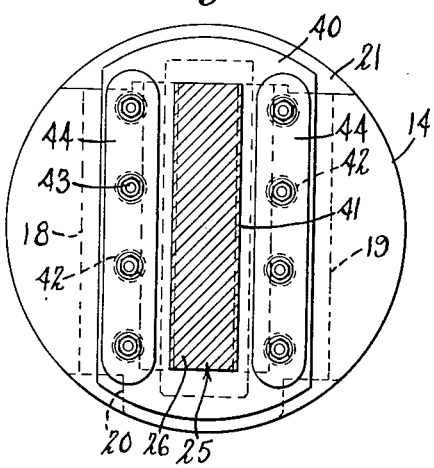
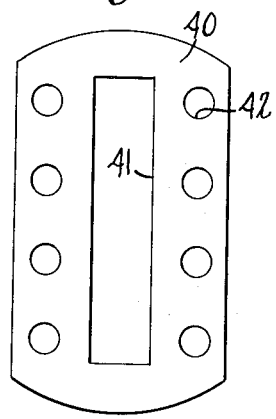
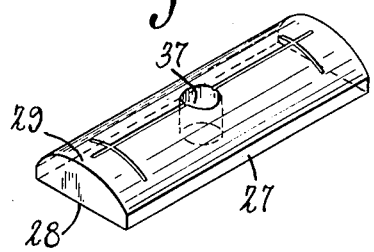

United States Patent Office 2,740,270
Patented Apr. 3, 1956

2,740,270
UNIVERSAL COUPLING

Carl F. Schnuck, North Haven, Conn., assignor to Farrel-Birmingham Company, Incorporated, Ansonia, Conn., a corporation of Connecticut Application April 17, 1953, Serial No. 349,468

4 Claims. (Cl. 64—7)

This invention relates to universal couplings, and more particularly to a universal coupling for use in connection with the driving of mill rolls or calender rolls or the like.

In mechanisms of this type the rolls are driven from a drive shaft which is in turn actuated by a power unit, and as the rolls of the mill, calender or other mechanism are so mounted so that they have some freedom of movement, it is necessary to provide a connection between the drive and driven shafts which will permit this movement. To this end a universal coupling is provided between the driving and the driven shafts, and these couplings usually consist of a hub secured to each of the shafts, the two hubs being connected by a spindle.

In some constructions the hubs are provided with overhanging horns having arcuate seats to receive so-called slipper shoes, one of the shoes being mounted upon each side of the spindle.

As the overhanging horns constitute extensions from the hub, they have a tendency to deflect away from the load even though they are made as heavy as is practicable and although they are sometimes connected by a centrally disposed bolt the maximum torque or driving pressure is at the extreme outer edges of the slipper shoes or spindle, and this central bolt is too far from the driving torque to be very effective in preventing deflection of the horns. There are other disadvantages in providing a central bolt of this kind to hold these overhanging horns together.

In the present invention the hub is so constructed that the portions thereof, which lie one upon each side of the slipper shoes and spindle, will be firmly secured together and, therefore, will be prevented from spreading. Moreover, in the present construction a simple trunnion may be provided at the center to support the spindle on the slipper shoes.

Also the lubrication of the bearing is improved in that means are provided to retain lubricant within the coupling instead of permitting it to flow therefrom. To this end a retaining plate is employed, which plate is wholly supported by the spindle and is so connected to the hub of the bearing that it is free to move with the oscillation of the spindle while at the same time is held tightly against the end surface of the hub. It will be understood that the periphery of the hub is closed on account of its construction to be later described, and as this plate embraces the spindle at the open end of the hub, grease or oil will be effectively retained therein.

One object of the present invention is to provide an improved universal joint for driving the rolls of mills, calenders, or the like.

A still further object of the invention is to provide a universal coupling wherein a hub secured to the driving or driven member or both is connected for universal movement to a spindle, the connection being so constructed that undue wear will be prevented and longer service promoted.

A still further object of the invention is to provide a universal coupling so constructed that grease, oil or other lubricant will be effectively retained within the bearing portion of the coupling and prevented from leaking therefrom.

To these and other ends the invention consists in the novel features and combinations of parts to be hereinafter described and claimed.

In the accompanying drawings:

Fig. 1 is a front elevational view of a drive unit and portions of mill rolls connected to the drive unit by universal couplings embodying my invention;

Fig. 2 is an enlarged view of the coupling member showing in section the driven unit of the member;

Fig. 3 is a sectional view of the coupling on line 3—3 of Fig. 2;

Fig. 4 is a transverse section on line 4—4 of Fig. 3;

Fig. 5 is a sectional view through the spindle of the coupling on line 5—5 of Fig. 3;

Fig. 6 is a face view of the lubricant-retaining plate; and

Fig. 7 is a perspective view of one of the slipper shoes.

To illustrate a preferred embodiment of my invention I have shown in Fig. 1 of the drawings in conventional form a power or driving unit 10 from which project driving shafts 11, each of which may be connected to a roll 12 of a mill, calender or the like by a universal coupling designated generally by the numeral 13. As each of the couplings is identical, it will be necessary to describe one side of the driving unit only.

As shown in Fig. 2 of the drawing, a hub 14 is secured to the neck 15 of the roll and keyed thereto by the keys 16 so that the hub will be rigidly secured to the roll. Projecting from the end face of the hub is a housing of U-shaped form, this housing comprising substantially parallel spaced legs 18 and 19 which are integrally connected at one end by the web portion 20. The open end of this housing, that is the end at the free ends of the legs 18 and 19, is closed by a cap 21 secured to the housing by bolts or the like 22, this cap being rabbeted, as shown at 23, so that it fits over projecting shoulders formed on the end faces of the legs 18 and 19 and prevents separation of these members. It will, therefore, be seen that the members 18 and 19 are integrally connected at one end by the web 20 and are firmly connected at the other end by the cap 21 so that they cannot spread apart.

These members 18 and 19 constitute horns projecting outwardly from the body of the hub, which parts receive between them the driving spindle, as will be hereinafter explained.

Connected to the drive shaft 11 and extending into the hub 14 is a driving spindle 25. As illustrated, this spindle is of rectangular shape in cross section and is reduced slightly at its end, as shown at 26. The reduced end of the spindle extends into the space between the horn members 18 and 19 and disposed upon each face of the spindle is a slipper shoe 27, these shoes being provided with a flat or plane surface 28 which rests upon the end 26 of the spindle and with an arcaute or cylindrical outer surface 29.

Arcuate recesses 30 and 31 are bored into the members 18 and 19 to receive the slipper shoes 27 and permit rotative movement of these shoes in the recesses upon oscillation or displacement of the spindle 25. The slipper shoes rest solidly at one end against the web portion 20 of the hub, and are held at the other end against longitudinal displacement by the cap 21, as shown more especially in Fig. 4. They are allowed, however, a rocking movement about the axis of the recesses 30 and 31. This permits displacement of the spindle in a direction transverse to its greater dimension.

In order that the end of the spindle shall have universal movement in the hub, it is provided with a pivotal connection with the slipper shoes which will permit movement about an axis at right angles to the axis of the slipper shoes. To this end the end 26 of the spindle is provided with a rectangular opening 33, and extending through this recess is a pin 34 having flattened sides 35 so that it is non-rotatably connected to the spindle. As shown more especially in Fig. 2 of the drawings, the pin is provided with rounded ends 36 rotatably mounted in openings 37 in the slipper shoes 27 so that the pin is permitted to rotate about its axis, thus permitting displacement of the spindle in a plane parallel to its longer dimension, as shown in Fig. 3.

Lubricant passages 38 may be provided in the horn members 18 and 19 to provide sufficient lubrication to the slipper shoes and to the pin 34 so that these parts will be well lubricated for their oscillating movement. It is noted from Figs. 2 and 4 of the drawings that there are three of these lubricant passages in each of the elements 18 and 19 so that the intermediate one in each member is in direct alignment with the pivot pin 34.

In order to retain the lubricant in the hub and in the space about the bearing which receives the end of the spindle 25, a retaining plate 40 (Fig. 6) is supported wholly by the end 26 of the spindle, this plate being provided with a rectangular opening 41 which receives the end of the spindle snugly therethrough, as shown in Fig. 2 and Fig. 5. The plate is provided with openings 42, which openings receive therethrough retaining studs 43, the body of the studs being considerably smaller than the openings 42 so as to permit free movement of the plate upon the end face of the hub. The studs 43 pass through clips or retaining members 44 which are urged into contact with the retaining plates 40 by springs 45 carried by the studs 43. The retaining members or clips 44 are elongated plate-like members, shown more especially in Fig. 5, and, as illustrated, each is held in place by four of the studs 43. It will be seen, therefore, that while the plate 40 is permitted to move with respect to the studs 43, it is urged under spring loading against the face of the hub so as to provide against the leakage of heavy oil or grease from the coupling.

It will be understood that a similar type of universal coupling is provided at the other end of the spindle 25 where a hub member 46 is keyed to the shaft 11 by the key 47, the hub 46 being provided with a coupling generally indicated at 48 similar in all respects to that described at the left-hand end (as shown in Fig. 2) of the spindle 25.

It will be apparent that by this construction a coupling is provided wherein the torque or driving pressure of the spindle, which is at a maximum at the extreme outer end of the slipper shoes, will not cause the elements 18 and 19 to spread apart but these elements will be retained against any spreading movement by the integrally formed web of metal 20 at one end and the cap 21 at the other end which is rabbeted so as to interlock with the ends of these members. Moreover, the provision of the lubricant-retaining plate 40, carried and supported entirely by the spindle 25 and spring pressed against the end face of the hub while permitting movement with respect to the hub, will effectively retain grease or oil lubricant within the coupling member so that wear and maintenance is greatly reduced.

While I have shown and described a preferred embodiment of my invention, it will be understood that it is not to be limited to all of the details shown, but is capable of modification and variation within the spirit of the invention and within the scope of the claims.

What I claim is:

1. A shaft coupling comprising a hub member securable to the end of the shaft, said member having projecting from the face thereof remote from the shaft a journal member of U-shaped cross section in a plane transverse to the shaft and having spaced leg portions, a spindle having its ends received between said leg portions to exert pressure thereagainst when the spindle is rotating, means spanning the free ends of said leg portions of the journal member and secured thereto to close the space therebetween, bearing members pivotally mounting said spindle in said journal member, said last-named members comprising slipper shoes disposed upon opposite sides of said spindle, and each of said shoes having a curved outer surface and being mounted in an arcuate recess in one of the leg portions of the journal member.

2. A shaft coupling comprising a hub member securable to the end of the shaft, said member having projecting from the face thereof remote from the shaft a journal member of U-shaped cross section in a plane transverse to the shaft and having spaced leg portions, a spindle having its ends received between said leg portions to exert pressure thereagainst when the spindle is rotating, means spanning the free ends of said leg portions of the journal member and secured thereto to close the space therebetween, bearing members pivotally mounting said spindle in said journal member, said last-named members comprising slipper shoes disposed upon opposite sides of said spindle, each of said shoes having a curved outer surface and being mounted in an arcuate recess in one of the leg portions of the journal member, and means for pivotally connecting the spindle to said slipper shoes.

3. A shaft coupling comprising a hub member securable to the end of the shaft, said member having projecting from the face thereof remote from the shaft a journal member of U-shaped cross section in a plane transverse to the shaft and having spaced leg portions, a spindle having flat faces at its end received between said leg portions to exert pressure thereagainst when the spindle is rotated, means spanning the free ends of said leg portions and secured thereto to prevent spreading thereof, a slipper shoe fitted against each flat face of said spindle and having a curved outer surface, each leg portion having an arcuate seat to receive one of said slipper shoes for rocking movement therein, and means connecting said spindle to said slipper shoes.

4. A shaft coupling comprising a hub member securable to the end of the shaft, said member having projecting from the face thereof remote from the shaft a journal member of U-shaped cross section in a plane transverse to the shaft and having spaced leg portions, a spindle having flat faces at its end received between said leg portions to exert pressure thereagainst when the spindle is rotated, means spanning the free ends of said leg portions and secured thereto to prevent spreading thereof, a slipper shoe fitted against each flat face of said spindle and having a curved outer surface, each leg portion having an arcuate seat to receive one of said slipper shoes for rocking movement therein, and means connecting said spindle to said slipper shoes for movement about an axis at right angles to that of the arcuate seats.

References Cited in the file of this patent

UNITED STATES PATENTS

| 1,617,908 | Hughson | Feb. 13, 1927 |
| 2,051,085 | Ilseman | Aug. 18, 1936 |
| 2,153,093 | Magee et al. | Apr. 4, 1939 |